United States Patent

Yokota et al.

[11] Patent Number: 5,886,957
[45] Date of Patent: Mar. 23, 1999

[54] DATA STORAGE APPARATUS

[75] Inventors: Teppei Yokota, Chiba; Nobuyuki Kihara, Tokyo, both of Japan

[73] Assignee: Sony Corporation, Tokyo, Japan

[21] Appl. No.: 50,445

[22] Filed: Mar. 30, 1998

[30] Foreign Application Priority Data

Apr. 10, 1997 [JP] Japan .................................... 9-092062

[51] Int. Cl.$^6$ .............................. G11B 11/00; G11B 13/00

[52] U.S. Cl. .................................. 369/13; 369/58; 369/14

[58] Field of Search ........................... 369/13, 14, 47–48, 369/32–33, 44.32, 44.28, 44.26, 44.29, 44.39, 58, 53–54; 235/454, 476, 486; 360/2

[56] References Cited

U.S. PATENT DOCUMENTS

5,315,569  5/1994  Saito et al. ........................... 369/44.32
5,805,550  9/1998  Ohmori .................................... 369/58

Primary Examiner—Ali Neyzari
Attorney, Agent, or Firm—Frommer Lawrence & Haug, LLP.; William S. Frommer

[57] ABSTRACT

A data storage apparatus excelling in portability by enabling data to be transferred between a detachable first recording medium having a relatively small capacity and an undetachable second recording medium having a large capacity. In particular, as a memory card using no special card is employed as first recording medium, and there is no need to specially provide a head elevating mechanism or a medium loading mechanism for the second recording medium, the size and thickness of the apparatus can be reduced.

11 Claims, 10 Drawing Sheets

MAGNETO-OPTIC DISC

FIG. 4

DATA CONTENTS OF MEMORY CARD

| FIG. 7A |
|---------|
| FIG. 7B |

FIG. 7A

- F121: CARD-RECORDED CONTENTS RECOGNIZED
- F122: BLANK CARD ?
  - N → F123: AS CARD IS NOT BLANK, INTENTION NOT TO LOAD DISPLAYED
  - Y → F124: ATTRIBUTES OF BLOCK TO BE LOADED AND ATTRIBUTES OF CARD COMPARED
- F125: OK ?
  - N → F126: WRONGNESS OF CARD DISPLAYED → (b)
  - Y → F127: ALL PICTURE DATA OF LOADED BLOCK TRANSFERRED TO CARD
- F128: VERIFY → (a)

DATA STORAGE APPARATUS

BACKGROUND OF THE INVENTION

1. Field of the Invention

The present invention relates to a recording/reproducing apparatus provided with an internal recording medium, capable of transferring data to and from a prescribed external recording medium.

2. Description of Related Art

Electronic data preservation using various recording media including discs, tapes and cards have become a common practice, and is extensively used in audio, video, photographic and computer apparatuses.

In consumer applications, it is often used in the recording of music, moving pictures and still pictures, and it is particularly in these fields that compatibility between different recording/reproducing systems is frequently required.

Moreover, different recording media are diverse in recording capacity, shape, size, therefore portability, and the configurations of the drive mechanism and other components of matching recording/reproducing apparatuses, and are designed to suit their respective purposes.

Meanwhile, conventional computers are generally known to have a large capacity hard disk drive and a floppy disk drive both built into them. Said hard disk drive and said floppy disk drive are connected by a data bus to permit data transfers between them.

However, the hard disk drive and the floppy disk drive built into the computer are provided with a magnetic head each and, moreover, an elevating mechanism to move said magnetic head up and down, with the consequence that it is difficult to make the computer portable, especially to reduce its thickness.

Further, the hard disk drive is particularly difficult to make its configuration thin because its magnetic head should be controlled so as to keep it at a prescribed distance from the disc surface.

Scrutiny of individual apparatuses for various purposes, which electronically preserve data on a recording medium, reveals that satisfactory modes of use are not always realized.

A digital still camera may be taken as an example. A digital still camera uses a memory card, for instance, as recording medium, keeps the data of the pictures shot with it, and can read out of the memory card photographic image data at any desired time to display the picture on a display unit consisting of a liquid crystal panel or a connected monitoring apparatus such as a television set at home.

Saving picture data of photographs on a highly portable small memory card is very convenient for photography. Using a memory card in an apparatus, such as a digital still camera, which is required to be compact and portable and, unlike disc media including a floppy disk and a magneto-optic disc, does not require a complex loading mechanism or recording/reproducing head mechanism, greatly facilitates the size and cost reduction of the apparatus.

However, a small memory card whose recording capacity is considerably smaller than that of a large capacity recording medium, such as a disc medium, is not suitable for preserving a large quantity of picture data. In other words, a large number of memory cards are required to keep picture data of photography.

On the other hand, if a disc medium is used instead of a memory card to achieve a large recording capacity, while a large volume of picture data can be preserved, it will entail the problems of complexity of the loading mechanism and the recording/reproducing head mechanism, together with the resultant larger size, poorer portability and higher cost of the apparatus.

In certain cases, including that of a digital still camera for instance, the most suitable system configuration for the intended purpose cannot be always chosen because of the strong and weak points of the recording medium to be used, and this problem is particularly serious with apparatuses for consumer use, on which the cost constraint is especially stringent.

SUMMARY OF THE INVENTION

In view of these problems, the present invention has been undertaken to realize a recording/reproducing apparatus for use in a system employing a recording medium for electronic data storage, which is particularly suitable for the preservation of a large quantity of data, and to achieve the optimal convenience of use by employing, for example, a small capacity portable recording medium.

According to the invention, there is provided a data storage apparatus comprising:

a built-in recording medium having a first recording capacity, housed undetachably in a recording apparatus having a relatively small capacity, as recording medium for a still camera or the like;

a head always kept in contact with said built-in recording medium to execute a recording/reproducing operation on said built-in recording medium;

a signal processing unit for encoding data for said built-in recording medium with said head and decoding data reproduced from said built-in recording medium with said head;

an insertion receptacle capable of letting a portable external recording medium, having a smaller recording capacity than said first recording capacity, be inserted thereinto;

a data bus for allowing data to be transferred between the external recording medium inserted into said insertion receptacle and said built-in recording medium; and a transfer control unit for allowing, in a state of standing by for recording, the magnetic head in contact with said built-in recording medium to take refuge in a refuge area where it does not record onto said built-in recording medium, and transferring, in a recording state, the magnetic head in contact with said built-in recording medium to an area where it records onto said built-in recording medium.

DESCRIPTION OF THE PREFERRED EMBODIMENT

Described below, as a preferred embodiment of the present invention, is a data storage apparatus capable of storing a large quantity of picture data photographically generated by a digital still camera.

Figure 1:
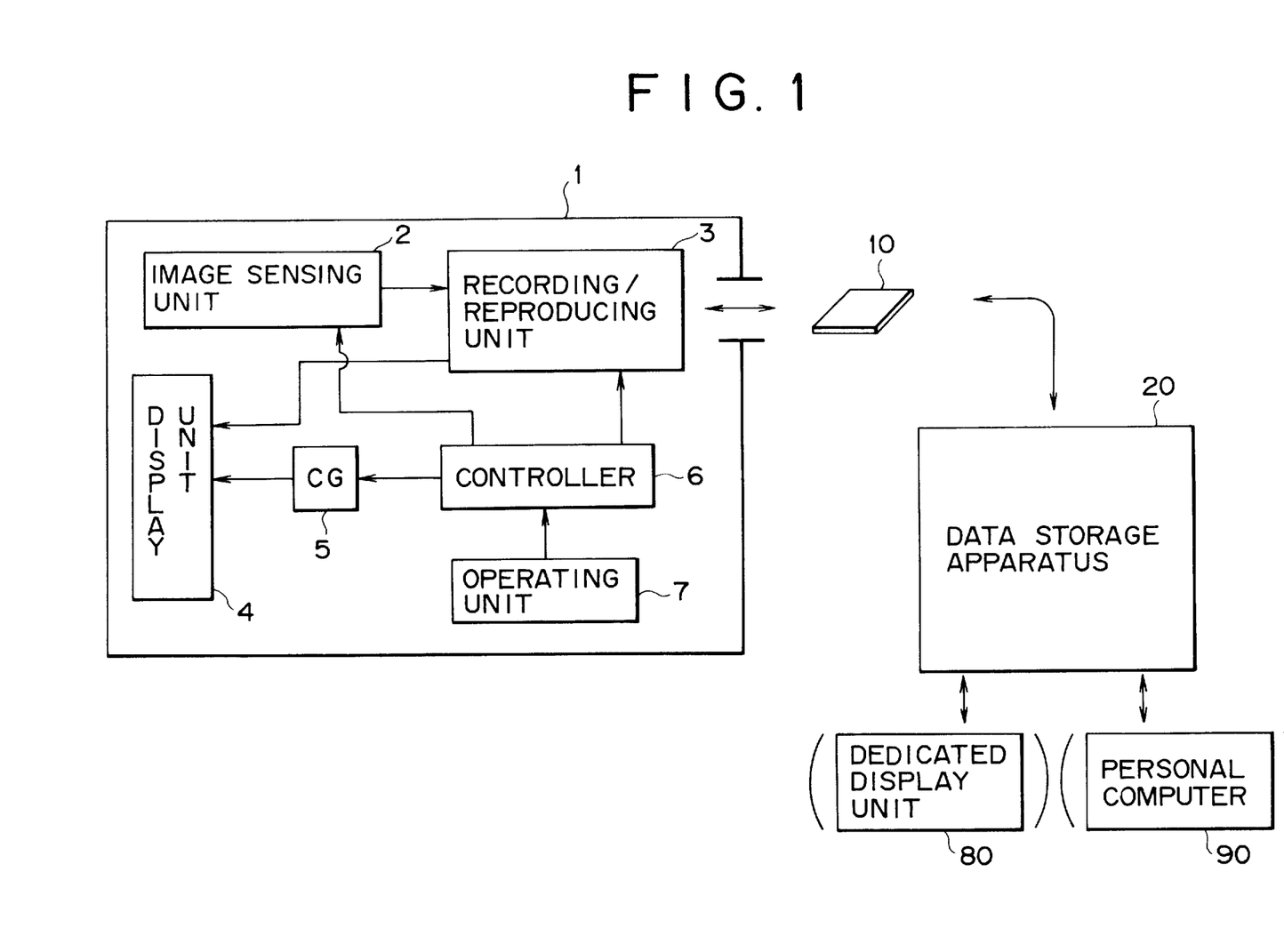
FIG. 1 is a block diagram of a system, adaptable to the present invention, comprising a digital still camera, a data storage apparatus and a memory enabling data to be transferred between said digital still camera and said data storage apparatus.

FIG. 1 illustrates how a data storage apparatus 20, as a recording/reproducing apparatus for this embodiment, is used with a digital still camera 1.

The digital still camera 1, as illustrated, may comprise an image sensing unit 2, a recording/reproducing unit 3, a display unit 4, a character generator 5, a controller 6 and an operating unit 7 among other constituent elements.

When taking a picture with this digital still camera 1, a memory card 10 is used as recording medium for recording and keeping the data of the picture taken.

The image sensing unit 2 is mounted with an image pickup mechanism such as a charge coupled device (CCD) and a lens system, and a visual signal processing circuit for encoding visual signals obtained by the image pickup mechanism into picture data or photographic image monitoring signals.

The recording/reproducing unit 3 is mounted with, among other things, a connector matching the memory card 10 and an address control circuit system as mechanisms for recording picture data on the fitted memory card 10 and reading picture data recorded on the memory card 10.

The display unit 4 is provided with a display panel, which may be a liquid crystal display for instance, and a display drive for causing the display panel to execute display operation.

The controller 6, consisting of a microcomputer, controls various units in accordance with an internal operational program in accordance with actions the user takes with various operating keys constituting the operating unit 7.

If, for example, the shooting mode is selected by an action from the operating unit 7, the controller 6 will instruct the image sensing unit 2 to take in picked-up images, generate monitor pictures and generate picture data to be recorded.

When in the shooting mode, a monitor picture is supplied to the display unit 4 as a picture of the object, coming incident from the lens assembly of the image sensing unit 2. In order to provide the user with information on the operating conditions, operating instructions and remaining battery capacity, the controller 6 causes the character generator 5 to supply necessary character data to the display unit 4.

The display drive of the display unit 4 drives the display panel according to these monitor picture signals and character data to present to the user pictures and necessary information on the part of the object.

The user, watching the display panel, selects the object by adjusting the shooting direction of the camera and the degree of zooming and, when the object is caught in a frame he or she has been looking for, releases the shutter from the operating unit 7. Then the controller 6 delivers to the recording/reproducing unit 2 the picture of the object obtained by the image sensing unit 2 at that point of time as photographic image data, and causes the memory card 10 to record the picture data as a photograph. For the memory card 10, it is usual to use one with a capacity of approx. 4 megabytes, allowing picture data for about 30 photographs to be recorded, it being assumed that each photograph consists of about 30 kilobytes of data.

On the other hand, when this digital still camera 1 is set in the reproducing mode by an action from the operating unit 7, the controller 6 instructs the recording/reproducing unit 3 to read picture data out of the fitted memory card 10 and, in response to the action from the operating unit 7, causes the picture data which are successively read out to be supplied to the display unit 4. The display unit 4 displays on the display panel the picture data reproduced and supplied by the recording/reproducing unit 3, and thereby enables the user to watch as he or she likes the photographic image recorded on the memory card 10.

For the digital still camera 1 using the memory card 10, a data storage apparatus 20 is provided as recording/reproducing apparatus for this embodiment of the invention.

Figure 2:
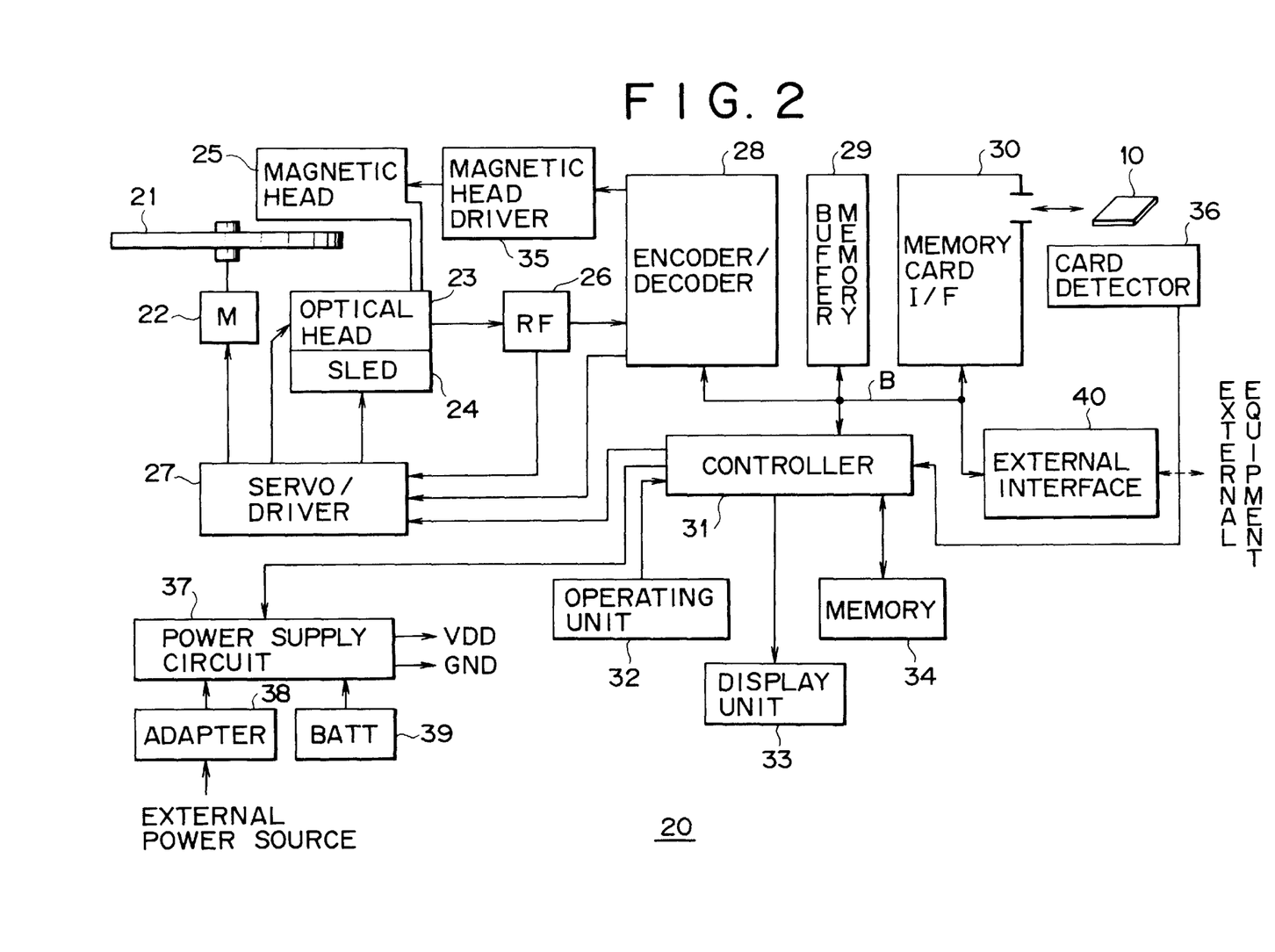
FIG. 2 is a block diagram of the inside of said data storage apparatus.

The data storage apparatus 20 may be configured as illustrated in FIG. 2, for instance.

First, there is provided a memory card interface 30 capable of reading data out of and writing data into the memory card 10. This memory card interface 30, like said recording/reproducing unit 3 of the digital still camera 1, has a recording/reproducing function for the memory card 10. Thus it is designed to enable, by loading the data storage apparatus 20 with the memory card 10 used with the digital still camera 1, the data storage apparatus 20 to read picture data, together with management information and incidental information to be elaborated upon below, out of, or write them into, the memory card 10.

Within the data storage apparatus 20 is provided a disc 21 as undetachable recording medium. The disc 21 may be an overwritable discal recording medium, such as a magneto-optic disc or a magnetic disc. In this embodiment of the invention, it is supposed to be a magneto-optic disc compatible with a magnetic field-modulated overwriting system. More specifically, it maybe an MO disc for use with computers, or a magneto-optic disc known as a minidisc for audio use. However, this disc 21 should have at least a greater capacity than the memory card 10 because it is used as fixed recording medium undetachable from the data storage apparatus 20 as mentioned above. For instance, a 140 megabyte disc medium is preferable, which may have a capacity to store about 4,600 photographs if the quantity of picture data per photograph is about as large as referred to above.

The disc 21 is loaded in a fixed manner so as to be driven by a spindle motor 22 to rotate. When data are to be recorded onto or reproduced from the disc 21, the disc 21 is irradiated with a laser beam by an optical head 23 while being turned by the spindle motor 22 either at a constant linear velocity (CLV) or at a constant angular velocity (CAV). The optical head 23 provides, when recording, a high level laser output to heat the recording track to the Curie temperature and, when reproducing, a relatively low level laser output to detect data from the reflected beam by the magnetic Kerr effect.

For these purposes, the optical head 23 is mounted with such elements as a laser diode as laser emitting means, an optical system comprising a polarizing beam splitter and an object glass among other things, and a detector for detecting a reflected beam. The object glass is held by a twin shaft mechanism within the optical head 23 so that it can be displaced in the radial direction of the disc and in a direction of moving off the disc.

Further a magnetic head 25 is arranged in a position opposite to the optical head 23 with the disc 21 in-between. The magnetic head 25 applies to the disc 21 a magnetic field modulated with the supplied data.

The whole optical head 23 and the magnetic head 25 are disposed to be movable in the radial direction of the disc by a sled mechanism 24.

Information detected by the optical head 23 from the disc 21 in a reproducing operation is supplied to an RF amplifier 26. The RF amplifier 26 extracts signals including reproduced RF signals, tracking error signals and focus error signals by arithmetic processing of the information supplied to it.

Out of the output of the RF amplifier 26, servo information is supplied to a servo/driver circuit 27.

The servo/driver circuit 27 generates various servo drive signals in response to the supplied tracking error signals and focus error signals, track jump instructions and access instructions from a system controller 31 consisting of a microcomputer, and detected rotating speed information on the spindle motor 22 from an encoder/decoder 28. According to the type of drive signal it generates, the servo/driver circuit 27 drives the twin shaft mechanism in the optical head 23 and the sled mechanism 24 to effect focus and tracking control and access control, to actuate the spindle motor 22, or to control CLV or CAV drive and stop.

The reproduced RF signals supplied from the RF amplifier 26 are supplied to the encoder/decoder 28.

The encoder/decoder 28 subjects the reproduced RF signals to binary conversion, demodulation, error corrections and the like to obtain reproduced data.

It also injects binarized signals into a PLL circuit to generate reproduced clocks for use in decoding, and extracts information on spindle rotation among other things.

The encoder/decoder 28, a buffer memory 29, the memory card interface 30, the controller 31, and an external interface 40 to be elaborated upon below are connected to a data and control bus B, and thereby enabled to have visual and other data and various control signals transferred among them.

For instance, picture data read out of the disc 21 and decoded by the encoder/decoder 28 are taken into the buffer memory 29. When data read out of the disc 21 are to be written into the memory card 10, as will be elaborated upon below, the data read out of the disc 21 and taken into the buffer memory 29 are transferred to the memory card interface 30 and written into the memory card 10 fitted to it.

On the other hand, when picture data recorded in the memory card 10 are to be recorded onto the disc 21, as will be described in more detail below, the picture data taken in from the memory card 10 by the memory card interface 30 are accumulated in the buffer memory 29, and supplied to the encoder/decoder 28 at a prescribed timing.

The data are further encoded by the encoder/decoder 28 according to an error correcting system or a data system compatible with a prescribed format adopted for the disc 21 to form record data for the disc 21, and those record data are supplied to a magnetic head drive 35, which supplies a magnetic head drive signal to the magnetic head 25 in response to the record data. Thus, the magnetic head 25 is caused to execute application of a magnetic field of either N or S to the disc 21. Also, at the same time, the system controller 31 supplies a control signal to the optical head 23 so as to cause a laser beam of a recording level to be supplied.

The external interface 40 is provided to exchange data with an external apparatus, such as a dedicated display unit 80 or a personal computer 90 separated from the data storage apparatus 20, as illustrated in FIG. 1.

Thus the external interface 40, provided with an interfacing function according to the given interface standard, such as RS232C and SCSI (small computer system interface), is enabled to supply picture data recorded on the disc 21 to an external unit or to record picture data supplied from an external unit onto the disc 21 or the memory card 10.

A display unit 33 consists of a liquid crystal display, for instance, and performs displaying of messages to the user and other functions as controlled by the controller 31.

Incidentally, this example of data storage apparatus 20 is provided with no display unit for displaying picture data recorded on the disc 21, and picture data are either displayed by the display unit 4 in the digital still camera 1 via the memory card 10 or transferred from the external interface 40 to and displayed by the dedicated display unit 80, but this data storage apparatus 20 may as well be equipped with an image display unit for displaying picture data stored on the disc 21.

An operating unit 32 is provided with operation keys and the like for giving operating instructions to the data storage apparatus 20, and in accordance the user's action taken from the operating unit 32, the controller 31 performs required operational control to have the necessary operation executed.

In this embodiment, various operating keys and dials are provided to make possible loading operations to record picture data on the disc 21 into the memory card 10, transfer operations to transfer picture data on the disc 21 via the external interface 40 to any other apparatus; deleting operations to delete picture data on the disc 21; mode selecting operations to set the mode for entering memo information incidental to picture data at the time of a loading operation, for instance, as will be elaborated upon below, and information input operations for entering memo information and the like.

A power supply circuit 37 of the data storage apparatus, having circuit systems including a DC-to-DC converter, provides various units with a source voltage VDD and a ground line GND. As power source, either a built-in battery (chargeable battery or dry battery) 39 or a commercial AC source may be used, in the latter case via a power supply adapter 38.

A card detector 36 detects whether or not the memory card 10 is loaded into the memory card interface 30, and supplies that detection information to the controller 31. The controller 31, in response to detection of the loading of the memory card 10, performs prescribed processing as will be elaborated upon below.

A non-volatile memory, such as a flush ROM, is used as memory 34. This memory 34 mainly stores management information regarding picture data to be stored on the disc 21, card attributes information regarding each block of picture data, and picture-accompanying information. Thus there is no need for the disc 21 to store a table of contents (TOC) as management area, and instead the memory 34 holds management information.

Figure 3:
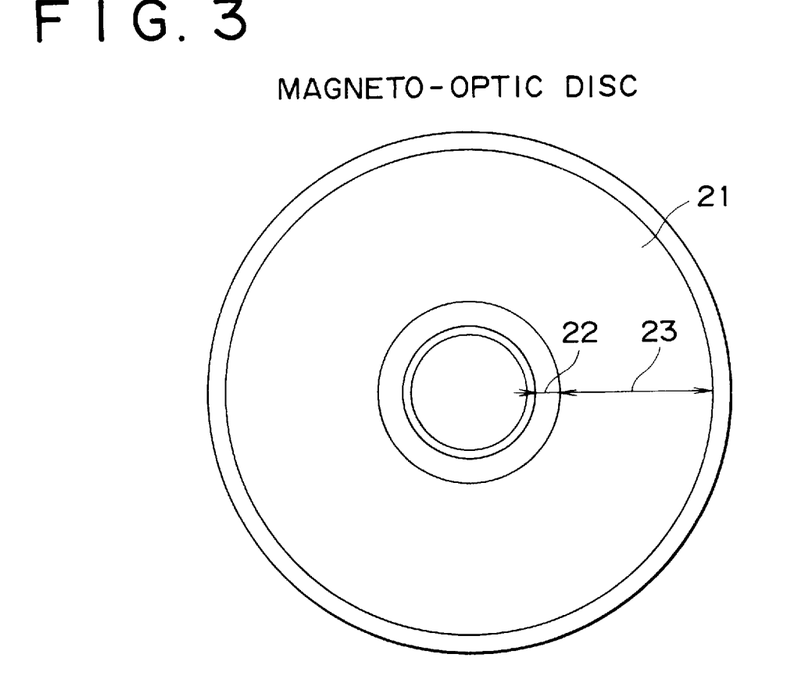
FIG. 3 illustrates the configuration of a magneto-optic disc to be housed undetachably in said data storage apparatus.

In this embodiment, the recording/reproducing area on the disc 21, as illustrated in FIG. 3, is divided into a data area 23 and a refuge area 22. The latter is an area for the head to take refuge in, as will be described in more detail below, but not used for data recording.

On the other hand, the data area mainly records, for example, on a block-by-block basis, picture data read in from the memory card 10.

The block in this context is a unit of data constituting all the picture data recorded on a single memory card 10. In other words, all the picture data read in from any single memory card 10 are recorded in the data area of the disc 21 as one block of picture data.

In the data area, management information for managing the blocks of picture data is not recorded, but such pieces of information as the address of each block on the disc 21, block length and information accompanying each are recorded in the memory 34.

Figure 4:
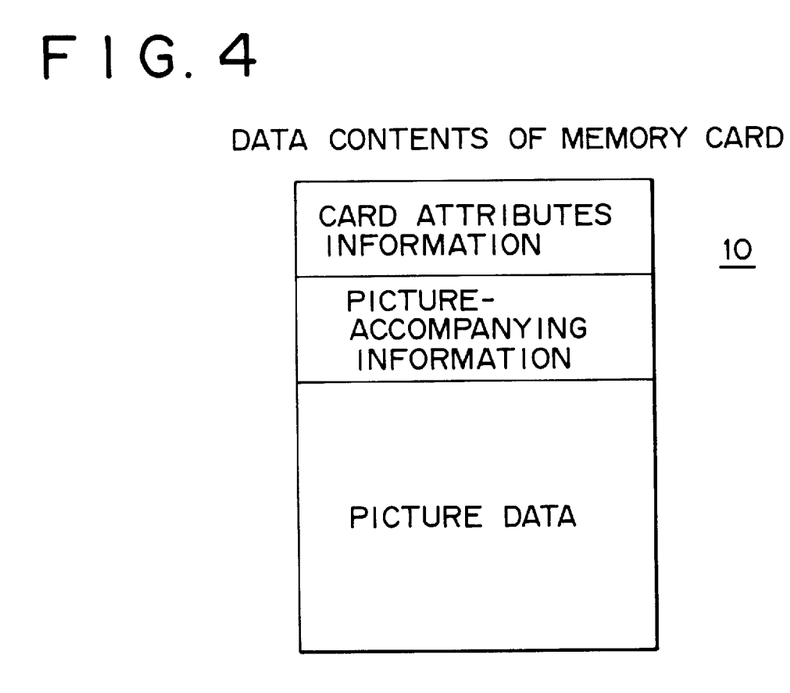
FIG. 4 shows the format of data stored in said memory card.

The memory card 10, into which the digital still camera 1 records picture data, records information of the contents illustrated in FIG. 4.

Thus, together with about 30 photographic images, for instance, as picked-up picture data, card attributes information is recorded in a certain area of the memory card 10. The card attributes information so recorded includes the recording data format of the memory card 10, area (address) setting information and other attributes of that memory card 10.

Another area is also available for recording picture-accompanying information, i.e. information regarding picture data recorded in that memory card 10, including date/hours information, memo information entered by the user and so forth. Incidentally, picture-accompanying information may be recorded for each individual set of picture data recorded in the memory card interface 30 as picture data.

When the memory card 10 having such data contents is loaded into the memory card interface 30, the controller 31 can read in card attributes information and picture-accompanying information together with picture data.

When a save operation is performed, all the picture data in the memory card 10 are recorded in the data area of the disc 21 as a single block of picture data, and management information generated incidental to the recording, such the address and block number on the disc 21, card attributes information read in from the memory card 10, and picture-accompanying information are stored into the memory 34.

Thus, by not recording management information on the disc 21, the data area on the disc 21 is more effectively utilized to allow a correspondingly greater quantity of picture data to be recorded.

Figure 5:
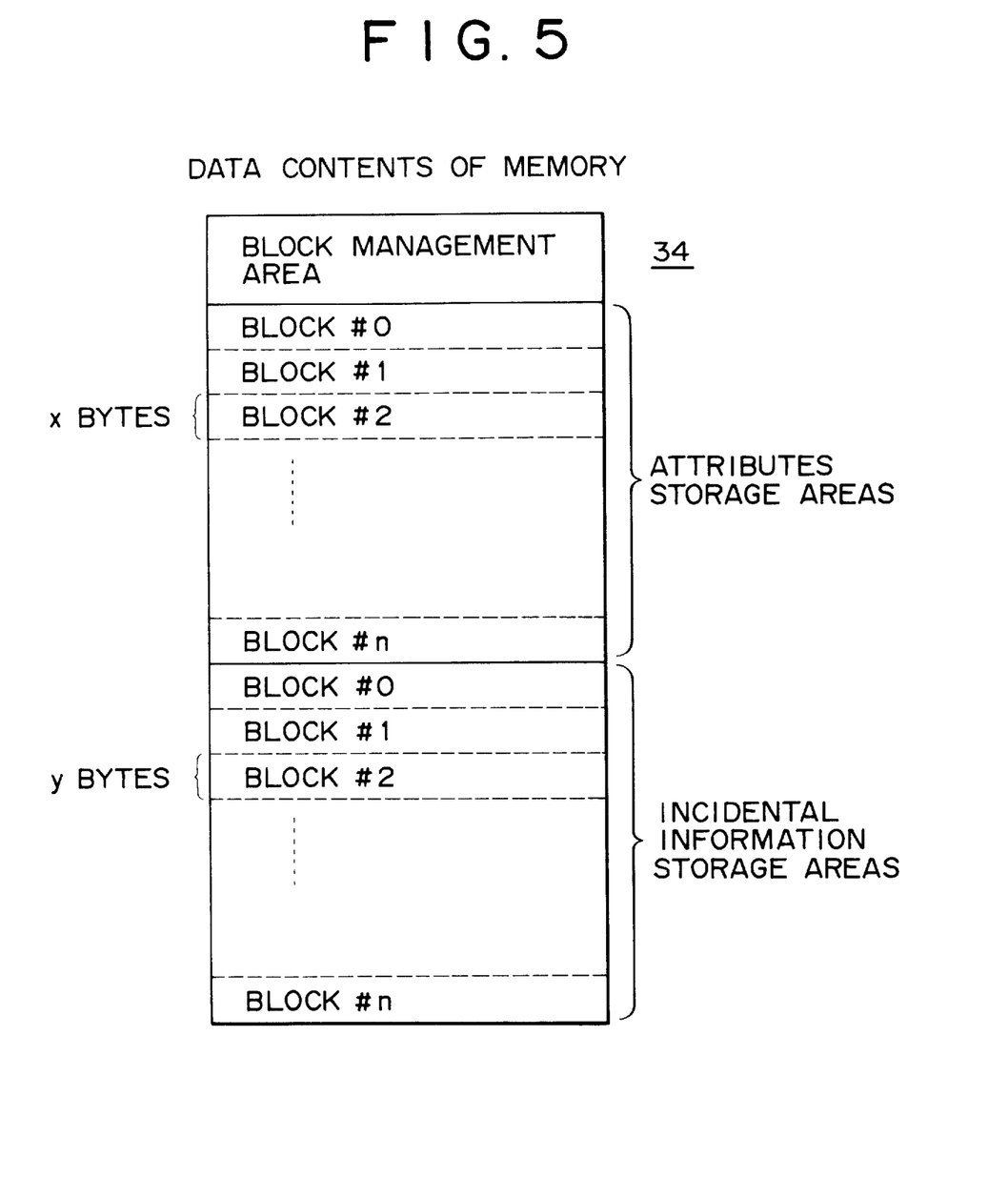
FIG. 5 is a block diagram of an attributes storage area and an incidental information storage area kept in said memory card.

The memory 34 stores management information and the like in a form, for instance, as shown in FIG. 5.

As illustrated, a block management area is first secured in the memory 34, where the address and size of each of the blocks recorded on the disc 21 are recorded. Now suppose that the smallest unit of the memory card 10 is 1 megabyte, and that the disc 21 can record the contents, i.e. picture data, of a maximum of 140 memory cards 10 (i.e. 140 blocks).

Information indicating, for example, which block in the block management area of the memory 34 uses how many units, is stated.

The address, size and so forth of any part of the data area of the disc 21 in which no picture data are recorded as yet are also recorded.

Following the block management area, an attributes storage area of x bytes is provided for each of blocks #0 to #n. In these areas of x bytes each is stored card attributes information read in from the memory card 10.

Further following them, an incidental information storage area of y bytes is provided for incidental information on each of the blocks #0 to #n. As incidental information, memo information entered by the user for each block, information for use in the classification of blocks and so forth can be stored.

Incidentally, since the disc 21 is supposed to allow no removal from the data storage apparatus 20, no loading mechanism or the like is provided for the disc 21. The mechanisms of the optical head 23 and the magnetic head 25 for use in recording data onto and reproducing them from the disc 21 are schematically illustrated in FIGS. 8A, 8B, 8C, 9A and 9B.

Figure 8A:
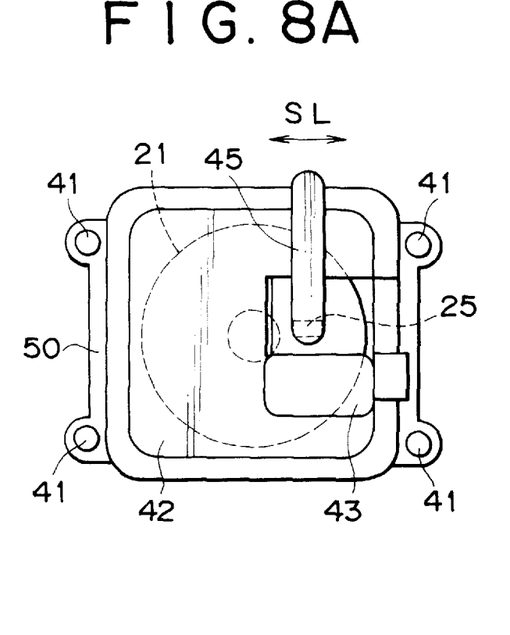
FIG. 8A is a schematic plan of the magneto-optic disc to be housed undetachably within said data storage apparatus.
Figure 8B:
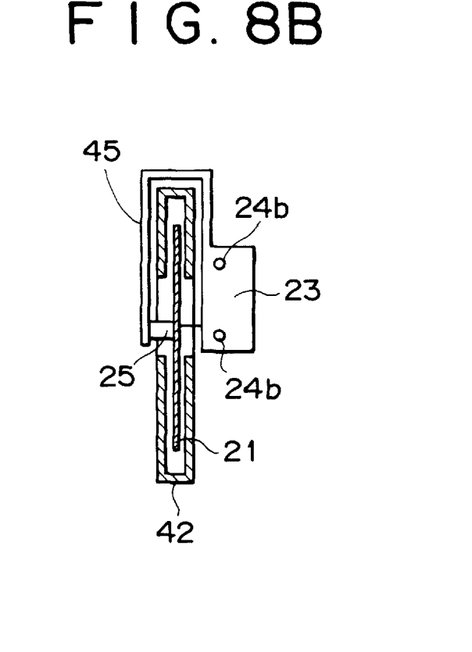
FIG. 8B is a schematic front view of the magneto-optic disc to be housed undetachably within said data storage apparatus and the receptacle thereof.
Figure 8C:
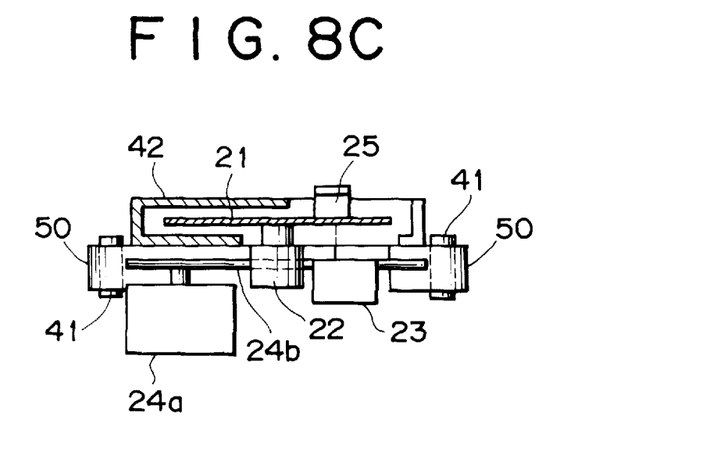
FIG. 8C is a schematic profile of the magneto-optic disc to be housed undetachably within said data storage apparatus and the receptacle thereof.

FIG. 8A is a schematic plan of the part around the heads, and FIGS. 8B and 8C are cross-sectional drawings, viewed respectively from the front and a side. Every one of these drawings show merely schematic images, but none of them illustrates actual head mechanisms. Furthermore, FIGS. 8B and 8C correspond only partially to the structure shown in FIG. 8A.

As shown in FIG. 8A, the disc 21 is a medium housed, for instance, in a disc cartridge 42. A medium known as, for example, as Minidisc (trade mark) or a magneto-optic disc, may be used as it is. When using such a commercially available medium, the data storage apparatus 20 need not give heed to the recording format or data form set for the system to which the medium belongs, but can set the recording format and data form for use on the disc 21 in its own way, because the disc 21 is irremovable from the data storage apparatus 20 and accordingly there is no need to worry about its compatibility with other apparatuses.

Obviously, instead of a commercially available medium, the disc 21 may be anything for exclusive use with the data storage apparatus 20. Nor does it have to be housed in a disc cartridge as illustrated in FIG. 8A.

In the configuration of FIG. 8A, whereas the disc 32 is supposed to be rotated by the spindle motor 22, the shutter 43 of the disc cartridge 42 is always kept open, and the disc 21 is exposed from the disc cartridge 42, and such a disc 21 (or a disc cartridge 42) is mounted in a fixed state on a chassis 50 supported by a floating mechanism 41.

Figure 9A:
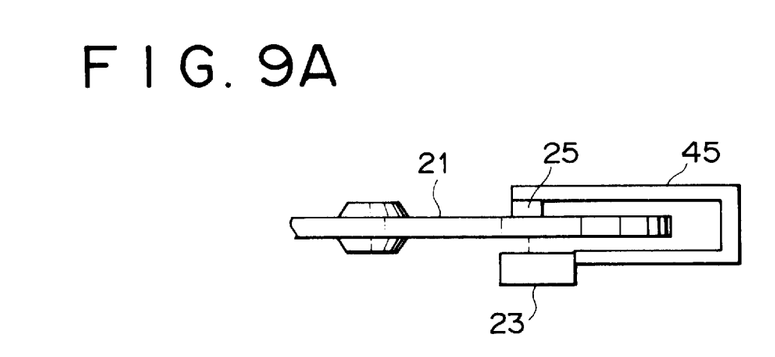
FIG. 9A is a schematic profile of a mechanism consisting of the magneto-optic disc to be housed undetachably within a data storage apparatus adaptable to the invention, a magnetic head, and an optical head.

The magnetic head 25, held by an arm 45, is arranged in contact with the disc 21 from above. When recording on the disc 21, a magnetic field is applied with the magnetic head 25 kept in contact with the disc 21 from above as illustrated in FIG. 9A, and the disc 21 is irradiated with a laser beam from underneath by the optical head 23. Although the magnetic head 25 is used only when it is involved in recording, it is always kept in contact with the disc 21 in this embodiment, i.e. in the state illustrated in FIG. 9A. The constant contact of the magnetic head 25 with the disc 21 in this manner means the absence of need to provide any elevating mechanism for the magnetic head 25, and accordingly a corresponding simplification and thinning of the head mechanism.

The magnetic head 25 and the optical head 23 are mechanically linked via the arm 45, and enabled to move in the radial direction of the disc by a sled motor 24a and a sled shaft 24b, together constituting a sled mechanism 24. Thus the optical head 23 is supported by the sled shaft 24b, which is turned by the sled motor 24a to move the optical head 23 and, together with it, the magnetic head 25 linked to it. Incidentally, for practical purposes, the sled mechanism 24 may conceivably use rack and pinion gears or a linear motor.

The constant contact of the magnetic head 25 with the disc 21 as in this instance might invite damage or wear of the recording face of the disc. In view of this risk, a refuge area is provided, for example, in the innermost part of the disc 21, and the controller 31 gives an instruction to the servo/driver circuit 27 to drive the sled mechanism 24 to keep the magnetic head 25 in contact with the disc 21 in the refuge area while no recording onto or reproduction from the disc 21 is taking place. This arrangement prevents, when neither recording nor reproduction is taking place, the part of the data area which would otherwise be in constant contact with the data area from being adversely affected and cause trouble to the recording or reproduction of data.

Incidentally, conceivably an elevating mechanism may as well be provided for the magnetic head 25. FIG. 9A illustrates a configuration in which an elevating mechanism 46 can move the magnetic head 25 between the position of contact drawn in solid lines and the position of non-contact drawn in broken lines.

In this configuration, for example, a memory card detection mechanism 47 checks whether or not the memory card interface 30 is loaded with the memory card 10, and the elevating mechanism moves the magnetic head 25 to its contact position when it is found loaded or to its non-contact position when it is found not loaded.

These elevating mechanism 46 and memory card detection mechanism 47 may be configured either electrically or mechanically.

If it is electrically configured, for instance, an arrangement may be conceived in which the memory card detection mechanism 47 consists of the aforementioned card detector 36, and the controller 31 drives the motor of the elevating mechanism 46 in response to information from the card detector 36 using a switching mechanism, an optical sensor or the like.

Or in a mechanical configuration, conceivably a cam mechanism or the like which is moved by the loading of the memory card 10 may elevate or lower the arm 45 of the magnetic head 25.

If the elevating mechanism 46 is to be provided as described above, there will be no need to set a refuge area in the disc 21 as shown in FIG. 3, and the recording capacity of the disc 21 for picture data can be expanded by also using that area for data recording.

The data storage apparatus 20 described above transfers data mainly to and from the memory card 10. The processes by the controller 31 for these data transfers will be described below with reference to FIGS. 6 and 7.

Figures 6, 6A:
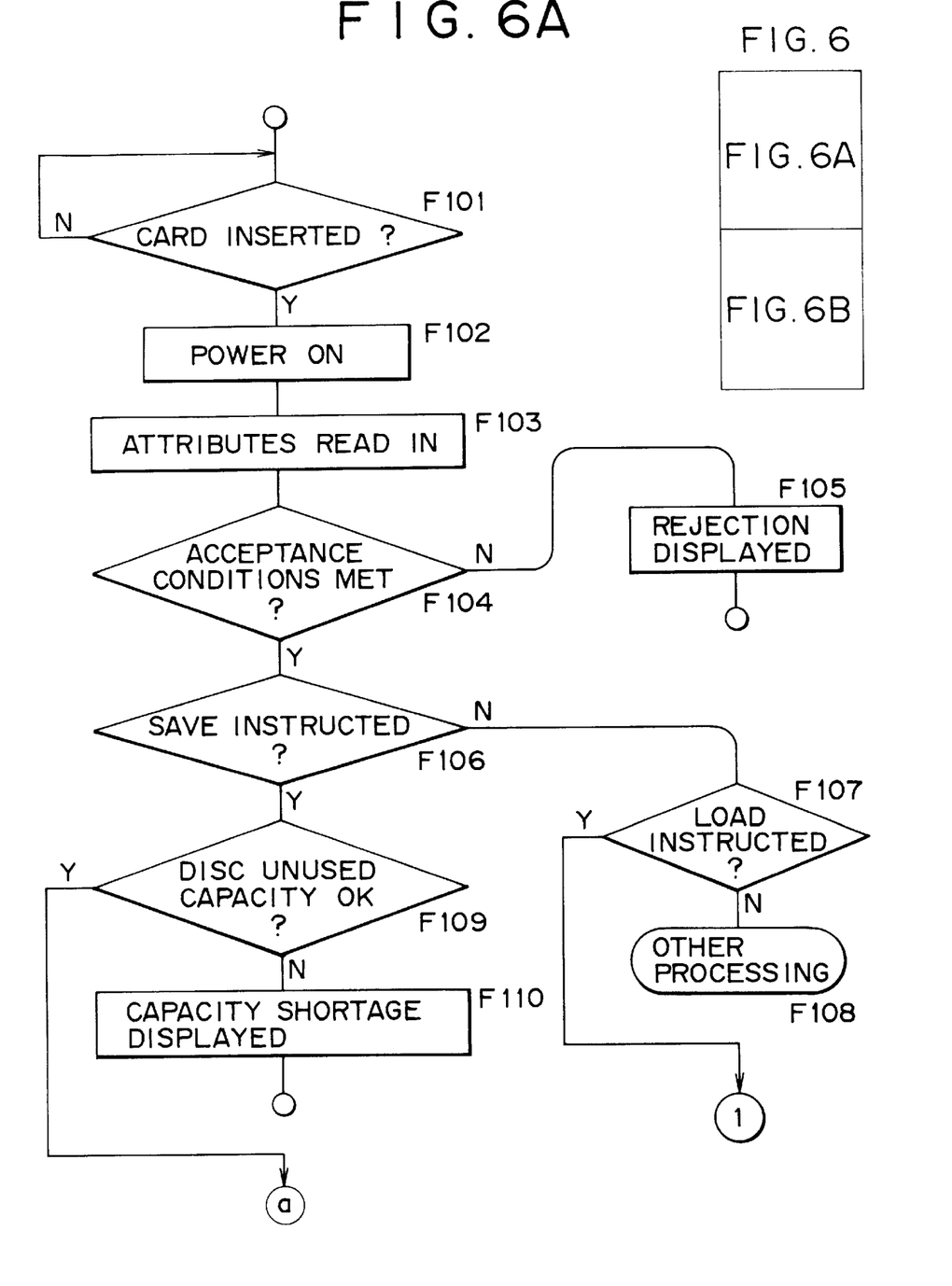
FIGS. 6A & 6B are flow charts showing how data are transferred from a memory card adaptable to the invention to a magneto-optic disc.
Figure 6B:
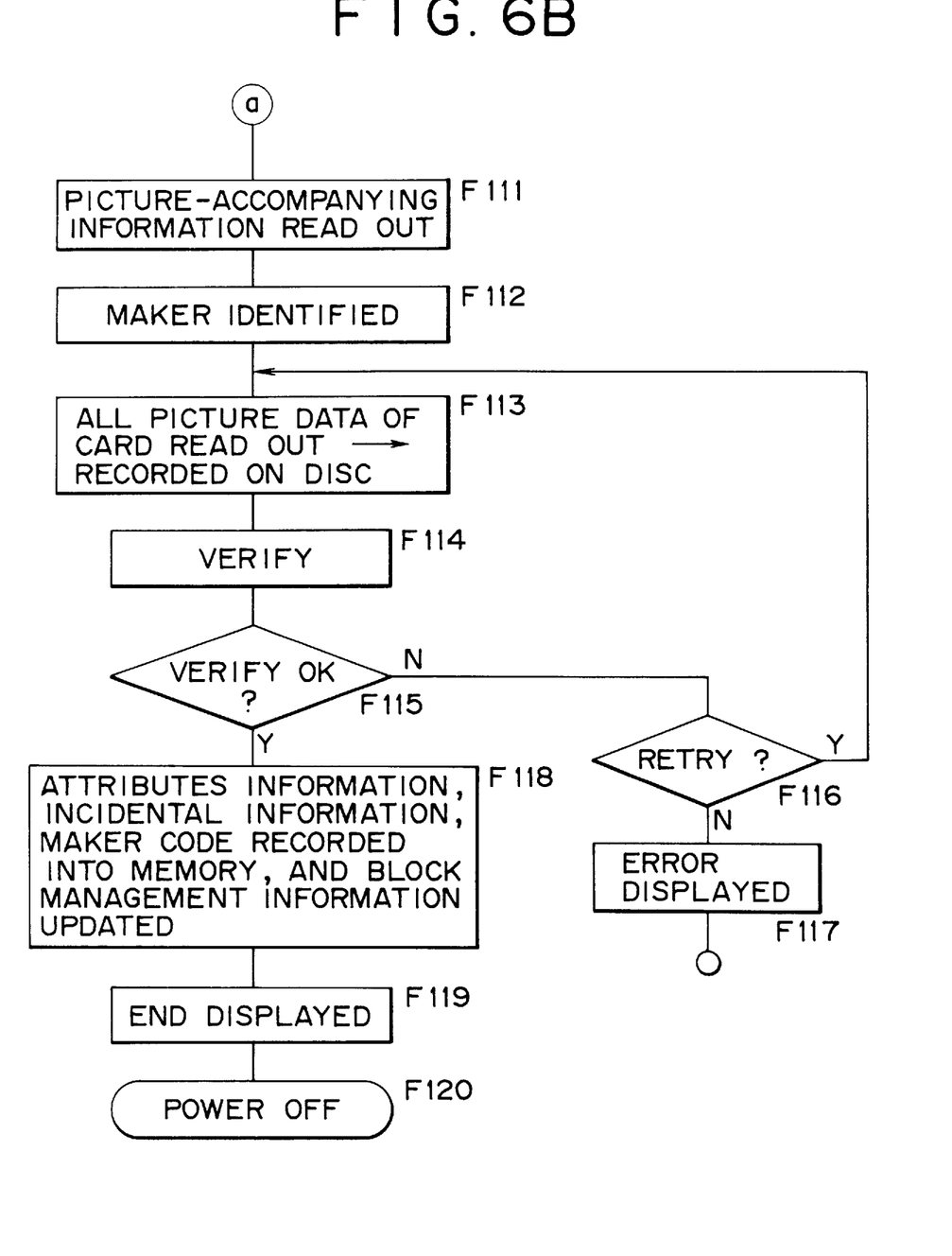

FIG. 6 shows processes from a state in which the power is off. Incidentally, even when the main power is off, a stand-by power VST is supplied to the controller 31 to keep it responsive to information on detection by the card detector 36.

When the power is off, the controller 31 is monitoring information from the card detector 36 and, when the loading of the memory card interface 30 with the memory card 10 is detected, goes to step F102 to turn on the power. Thus begins the supply of a source voltage VDD from the power supply circuit 37 to various units.

While the above-described configuration supposes automatic turning-on of power supply in response to the insertion of the memory card 10, obviously it is also conceivable to provide the operating unit 32 with a power key, whose manipulation turns the power supply on or off. Combination of automatic power turning-on/off and manual switching-on/off is also conceivable.

Of course, where there is no automatic power-on, monitoring is performed at step F101 with the power on and, when the memory card 10 is loaded, the controller 31 will go to step F103, skipping the processing of step F102

At step F103, the memory card interface 30 is instructed to read in card attributes information from the loaded memory card 10, and discerns the contents of the card attributes information which has been read in.

In the memory card 10, different formats may be present at the same time, owing to differences in the manufacturer and/or type of the digital still camera 1. Accordingly there can be a memory card 10 in which picture data and the like are recorded in a format incompatible with this data storage apparatus 20. If the inserted memory card 10 is found to be so and the card attributes information which has been read in indicates that the conditions for data acceptance are not met, the controller 31 will move on from step F104 to step F105, and a message of rejection is displayed on the display unit 33. Thus the user is informed that the loaded memory card 10 is incompatible with this data storage apparatus 20.

If it is confirmed from the card attributes information that the conditions of acceptance are met, the user's actions will be discerned at steps F106 and F107.

The user, if he or she wants to transfer picture data in the memory card 10 to the disc 21 and preserve them there, will perform a save action or, if conversely he or she wants to take picture data on the disc 21 into the memory card 10, perform a load action.

Figures 7, 7A:
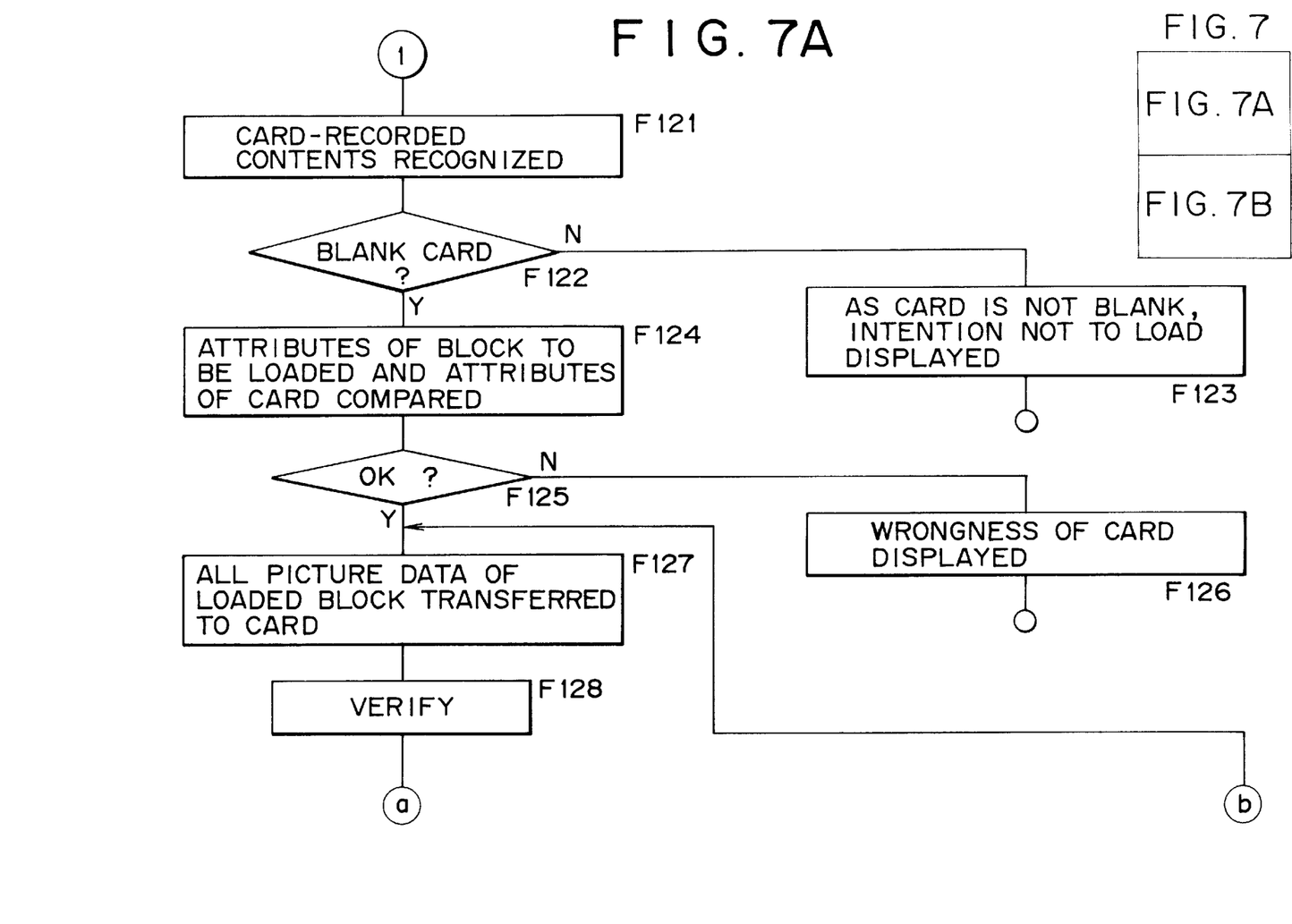
FIGS. 7A and 7B are flow charts showing how data are transferred from the magneto-optic disc adaptable to the invention to the memory card.

If a load action is detected, the controller 31 will move on from step F107 to processes shown in FIG. 7 as indicated by ①. Or if a save action is detected, it will go on from step F106 to processes of and after F109.

If any other action is taken, the controller 31 will respond to perform a corresponding processing.

If a save action is taken, i.e. the user instructs picture data in the memory card 10 to be saved on the disc 21, the controller 31 will proceed to step F109, and first checks the unused capacity available for the recording of picture data on the disc 21. This checking of the unused capacity is performed in accordance with information in the block management area stored in the memory 34.

If it is determined that no sufficient unused capacity to record all the picture data recorded in the loaded memory card 10 remains on the disc 21, capacity shortage will be displayed on the display unit 33 at step F110, the user will be informed of impossibility to execute saving, and the controller 31 will wait for the next action.

If the unused capacity on the disc is found sufficient, the controller 31 will move on to step F111, and first instruct the memory card interface 30 to read out picture-accompanying information from the memory card 10. Then the controller 31, at step F112, identifies the maker of the digital still camera, which recorded picture data into that memory card 10, from the picture-accompanying information which has been, or was previously, read in.

Then at step F113, the memory card interface 30 is caused to read in all the picture data from the memory card 10 and, while the picture data are successively taken into the buffer memory 29, the picture data taken into the buffer memory 29 are caused to be successively supplied to the encoder/decoder 28, which is caused to perform encoding and supply the encoded data to the magnetic head driver 35 to execute application of a magnetic field from the magnetic head 25. At the same time, the servo/driver circuit 27 is instructed to drive the rotation of the disc 21 and to supply a recording laser beam for the optical head 23.

The picture data recorded in the memory card 10 are thereby recorded onto the disc 21.

Upon completion of the recording of all the picture data into the memory card 10 onto the disc 21, next a verifying action is taken at step F113. Thus the picture data read out at step F113 are compared with picture data recorded into the memory card 10, for instance those read out from the memory card 10 and held in the buffer memory 29, to check whether or not the data were correctly recorded.

If any recording error is detected by the verifying action, the controller 31 will proceed from step F115 to step F116 and judge whether or not recording is to be retried. If, for instance, it is set so as to perform a maximum of N trials for any recording error, it will be determined that retrials will be done until step F116 is reached N+1 times, and the controller 31 will return to F113.

On the other hand, if a recording error is still detected even after recording is done N times, the controller 31 will move from step F116 to step F117, display the detection of the error on the display unit 33 to make it known to the user, and stops the save action.

If completion of normal recording is confirmed as a result of the verifying action at step F114, the memory 34 will be caused to store at step F118 already read-in card attributes information and picture-accompanying information, to which a maker identification code based on the identification at step F112 was added, and the contents of management information in the block management area are updated to place all the picture data recorded on the disc 21 as one block of picture data.

As the foregoing processes complete the action to save picture data from the memory card 10 onto the disc 21, completion of the save action is displayed on the display unit 33 at step F119, and the power supply circuit 37 is controlled at step F120 so as to turn off power supply.

It goes without saying that if, as referred to earlier, the power is turned on or off only in response to a manual action at the operating unit 32, the processing at step F120 will be dispensed with.

After the memory card 10 is loaded and the processes from step F102 are performed, if the user's action designating a certain block of picture data and instructing its loading is detected, the controller 31 will go on to step F121 as referred to above.

In this case, a processing to record a block of picture data recorded on the disc 21 into the memory card 10 is started.

First at step F121, it is recognized how picture data are recorded in the memory card 10.

Here, it is determined whether or not the memory card 10 is a blank card in which no picture data are recorded from the outset or data were recorded in the past but are already deleted.

If it is found not to be a blank card, the controller 31 will move on from step F122 to step F123, display on the display unit 33 non-execution of loading on account of its not being a blank card, and complete the processing.

This is a processing intended not to delete picture data in the memory card 10, as it is found not blank, by the execution of loading.

If it is found to be a blank card, the card attributes information earlier read in at step F 103 and the attributes information of the block to be loaded are compared at step F124. The attributes information of the block to be loaded are the attributes information stored for that block in the attributes recording area of the memory 34 shown in FIG. 5.

If the comparison of attributes information reveals that the block to be loaded is incompatible with the loaded memory card 10 in format, data form and/or any other respect, the controller 31 will go on from step F125 to step F126, display on the display unit 33 non-execution of loading on account of the incompatibility of attributes, and complete the processing.

If the block to be loaded is found compatible with the attributes of the memory card 10, the controller 31 will go on to step F127 to execute loading.

Thus the servo/driver 27 is instructed to drive the rotation of the disc 21 and supply a laser beam for reproduction by the optical head 23, and picture data read out by the optical head 23 and decoded by the encoder/ decoder 28 are taken into the buffer memory 29. The picture data are transferred from the buffer memory 29 to the memory card interface 30 at a prescribed timing, and recorded into the memory card 10.

Upon completion of the recording of all the picture data as designated block into the memory card 10, a verifying action is next performed at step F128. Thus, the picture data recorded at step F127 are read out of the memory card 10, compared with picture data of the designated block (for instance, picture data read in from the disc 21 and held in the buffer memory 29), and the data are checked to find out whether or not recording was done correctly.

Figure 7B:
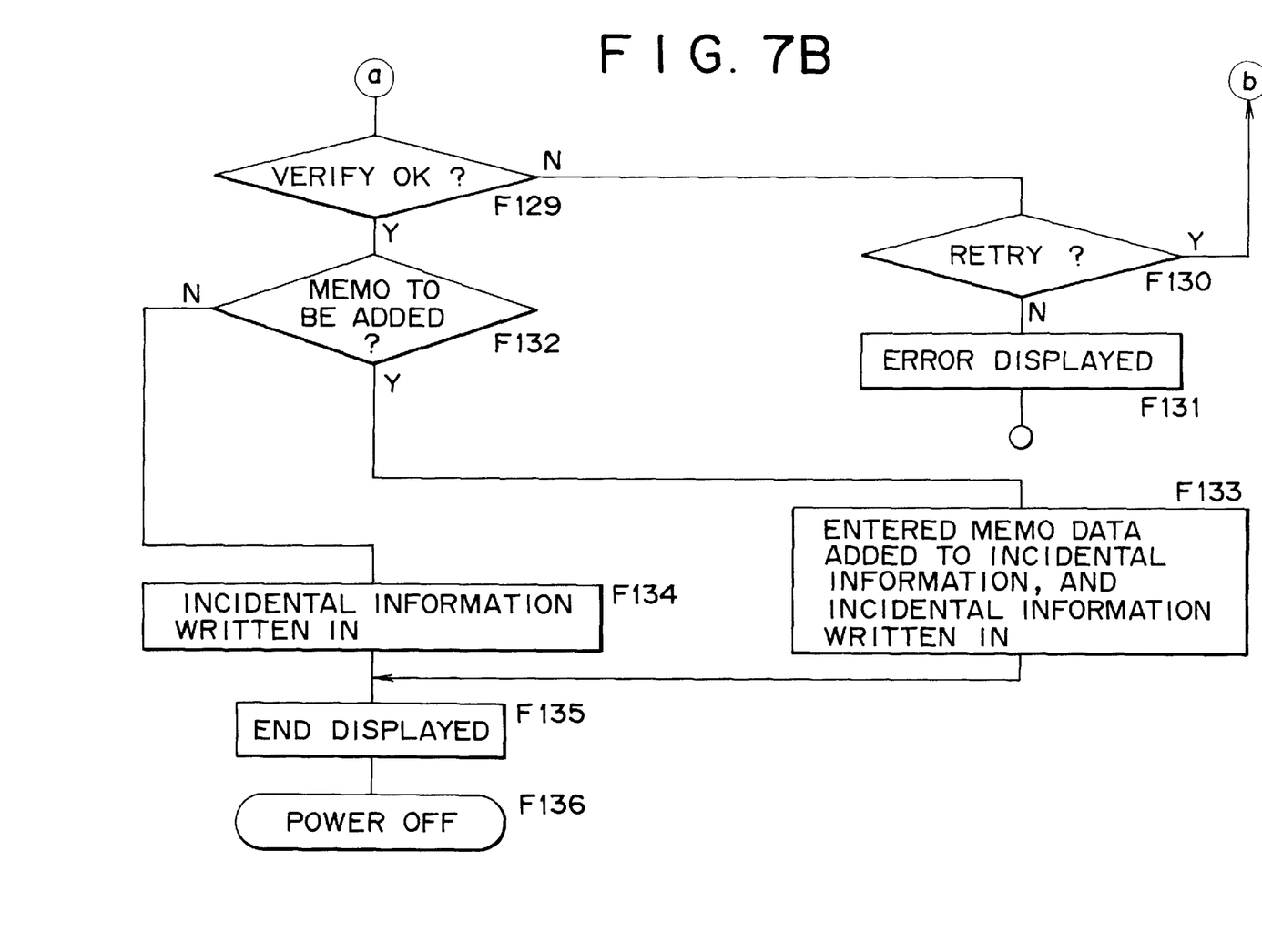

If any recording error is detected by the verifying action, the controller 31 will proceed from step F129 to step F130 and judge whether or not recording is to be retried. If, for instance, it is set so as to perform a maximum of N trials for any recording error as in the above-described case of save action, it will be determined that retrials will be done until step F130 is reached N+1 times, and the controller 31 will return to F127.

On the other hand, if a recording error is still detected even after recording is done N times, the controller 31 will move on from step F130 to step F131, display the detection of the error on the display unit 33 to make it known to the user, and stop the load action.

If completion of normal recording is confirmed as a result of the verifying action at step F128, the controller 31 will go on from step F129 to step F132, and asks the user to decide whether or not to add memo information. Thus it executes a display on the display unit 33 asking whether or not to add a memo, and awaits next action by the user.

If the user's action indicates addition of memo information, the controller 31 will await at step F133 entry of the memo information and, upon entry, adds that information to the contents of the incidental information corresponding to that block stored in the memory 34. It will transfer the augmented information to the memory card interface 30 to have it recorded into the memory card 10.

On the other hand, if there is no action to add memo information, the controller 31 will proceed from step F132 to step F134, transfer to the memory card interface 30 the contents of the incidental information corresponding to that block stored in the memory 34, and have it recorded into the memory card 10.

As the foregoing processes complete the action to load picture data from the disc 21 into the memory card 10, completion of the load action is displayed on the display unit 33 at step F135, and the power supply circuit 37 is controlled at step F130 so as to turn off power supply.

It goes without saying that if, as referred to earlier, the power supply is turned on or off only in response to a manual action at the operating unit 32, the processing at step F130 will be dispensed with.

The foregoing processes shown in FIGS. 6 and 7 realize save and load operations between the data storage apparatus 20 and the memory card 10, and such a data storage apparatus 20 enables a satisfactory form of use for the digital still camera 1 for example.

First, whereas the user can preserve in the memory card 10 picture data of the photographs he or she has taken with the digital still camera 1, these picture data are equivalent to, for example, about 30 photographs. Then, when the user has taken about 30 photographs, he or she can store onto the disc 21 the picture data of those approximately 30 photographs by loading that memory card 10 into the data storage apparatus 20 and causing it to execute a save operation.

When the digital still camera is to be used next time, the same memory card 10 can be made usable for further picture taking by initializing that memory card 10.

Thus, by saving the pictures recorded into the memory card 10 into the data storage apparatus 20 successively, a single memory card 10 is made sufficient, and the need to keep many memory cards 10 in stock is eliminated.

As the data storage apparatus 20 can store a considerably large quantity of picture data, depending on the capacity of the disc 21 among other things, the undetachability of the disc 21, as in this embodiment, would pose no capacity problem at all for consumer use for example.

However, in a long period of consecutive use, the capacity of the data storage apparatus 20 may be fully used, possibly resulting in going on to step F110 in FIG. 6 cited above.

Since the disc 21 cannot be replaced, no further save operation can be formed as it is, but in such a case the external interface 40 can be used to transfer the whole or part of the picture data recorded on the disc 21 to an external unit (for instance, the hard disk of a personal computer), and further data can be stored into that external unit.

The picture data copied by the external unit can be deleted from the disc 21 by the user's deleting action, so that an unused capacity can be secured on the disc 21.

Incidentally, this kind of relief measure is possible even without the external interface 40. Thus the memory card 10 can be used for having the external unit copy picture data, and the copied picture data can then be deleted from the disc 21.

Obviously, an unoccupied capacity can as well be secured by deleting no longer needed picture data by the user's deleting action.

Furthermore, by making the disc 21 irremovable, a loading mechanism for inserting or ejecting the disc 21 is dispensed with in the data storage apparatus 20, resulting in simplification of the disc drive mechanism and a consequent cost reduction of the data storage apparatus 20 as a whole.

While a loading mechanism inevitably tends to be subject to trouble or faulty operation because it involves a complex mechanism for carrying a disc, the data storage apparatus 20 having no disc loading mechanism is free from this worry.

Picture data stored in the data storage apparatus 20 are made visible on the display unit 4 of the digital still camera by loading them into the memory card 10.

Furthermore, by loading picture data stored on the disc 21 into an external unit, such as a personal computer 90 or a dedicated display unit 80, via the external interface 40, they can as well be displayed.

In other words, the user can look at picture data stored on the disc 21 as he or she desires. Of course, the picture can also be edited if they are loaded into a personal computer or the like.

Moreover, for each of the blocks recorded on the disc 21, incidental information can be recorded in the memory 34 in addition to management information.

It may as well be made possible for this incidental information to be additionally entered by the user as he or she likes after its saving. Where, for instance, the members of a family share the use of the same data storage apparatus 20, it is conceivable to add each user's name corresponding to his or her block as incidental information, or for any user to add indices denoting business use, hobby use, and the like for corresponding blocks. Of course, each individual user can add index information for more diverse classification to each block.

If data are to be loaded into the memory card 10 or an external unit, the controller 31 will await indication of the block to be loaded. In this case, an operating system is conceivable wherein, by having the user designate the index, maker code or any other key given as incidental information, the memory 34 can be searched for the corresponding block, that block is then extracted, and loading is executed with that extracted block as what is to be loaded. This arrangement would enable the user, even if a large volume of picture data is stored on the disc 31, to readily load required picture data into the memory card 10 or an external unit.

The controller 31 further files and classifies the blocks according to incidental information thereon stored in the memory 34, and enables the user to readily check the contents of the disc 21 by having the classification displayed on the display unit 33.

Incidentally, the sequence of processes shown in FIGS. 6 and 7 is nothing more than an example, and many different sequences are conceivable besides that.

Although loading is supposed to be stopped at step F123 of FIG. 7 if the memory card 10 is not found blank, the configuration may as well be such that an alarm is displayed, indicating that the card on the display unit 33 is not blank at this point of time, and if the user still instructs execution of loading, the controller 31 will proceed to step of and after F124 to start loading.

It is further conceivable to have loading or saving automatically executed according to the memory card 10 that is inserted.

Thus, if the memory card 10 is not blank, its insertion will be assumed to mean requesting of a save operation, and a save operation will be started even if the user does not take a save action. Conversely, if a blank card is inserted, the insertion will be taken as a load instruction, the user will be requested to designate the block to be loaded, and a load operation can be started in response to his or her designating action.

Figure 9B:
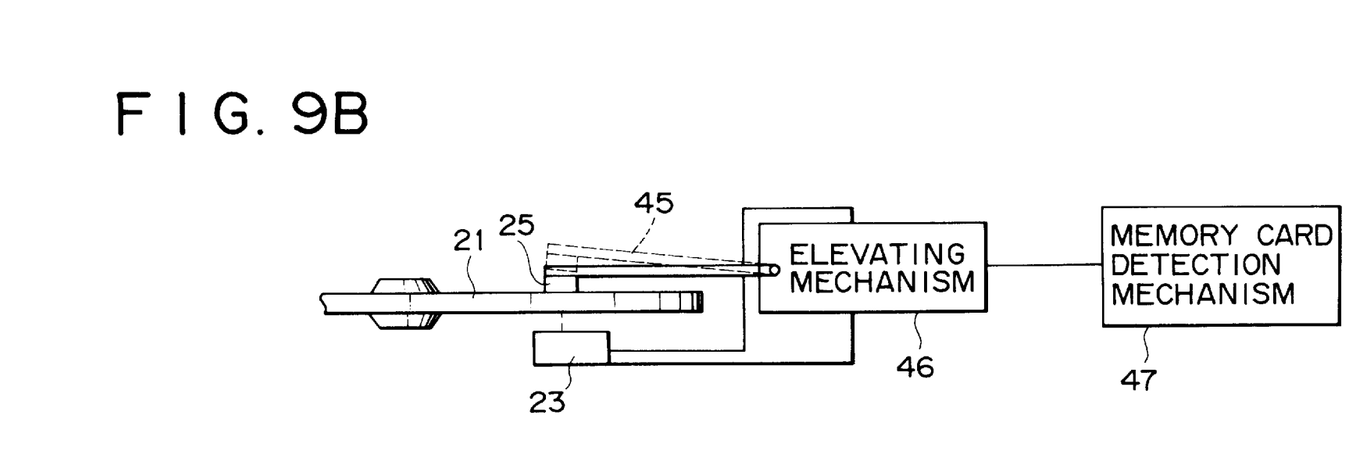
FIG. 9B is a schematic profile of a mechanism consisting of the magneto-optic disc to be housed detachably within a data storage apparatus according to the prior art, a magnetic head, and an optical head.

Incidentally, where the magnetic head 25 is provided with the elevating mechanism 46 as in FIG. 9B and the elevation or lowering is controlled by the controller 31, an operational control to bring the magnetic head 25 into contact with the disc 21 may be effected at, for instance, a timing following step F102 in FIG. 6.

Although the above-described embodiment is a data storage apparatus 20 matching a digital still camera, it goes without saying that a recording/reproducing apparatus according to the invention is applicable as a recording/reproducing apparatus for data storage matching various other apparatuses.

While a magneto-optic disc is selected as example of internal recording medium, a magnetic disc, such as a hard disk used in computers, a magnetic tape for data storage, a write-once type optical disc or the like may as well be used for this purpose.

As hitherto described, to be comparable to the large capacity hard disk drive and the floppy disk drive provided in conventional computers, a configuration having only a memory card and a magneto-optic disc-based recording/reproducing unit has been chosen, so that only one magnetic head suffices. Furthermore, dispensation with the elevating mechanism for the magnetic head has made this data storage apparatus excel over conventional ones in reduced size and thickness.

What is claimed is:

1. A data storage apparatus comprising:
   a built-in recording medium, having a first recording capacity, housed undetachably in a recording apparatus;
   a head always kept in contact with said built-in recording medium to execute a recording/reproducing operation on said built-in recording medium;
   a signal processing unit for encoding record data for said built-in recording medium with said head and decoding data reproduced from said built-in recording medium with said head;
   an insertion receptacle capable of letting a portable external recording medium, having a smaller recording capacity than said first recording capacity, be inserted thereinto;
   a data bus for allowing data to be transferred between an external recording medium inserted into said insertion receptacle and said built-in recording medium; and
   a transfer control unit for allowing, in a state of standing by for recording, the magnetic head in contact with said built-in recording medium, to take refuge in a refuge area where it does not record onto said built-in recording medium, and transferring, in a recording state, the magnetic head in contact with said built-in recording medium to an area where it records onto said built-in recording medium.

2. A data storage apparatus as claimed in claim 1, further provided with a memory for recording management information for managing a program recorded in said built-in recording medium.

3. A data storage apparatus as claimed in claim 1, wherein said built-in recording medium is a magneto-optic disc and said head is a magnetic head.

4. A data storage apparatus as claimed in claim 1, wherein said external recording medium is a memory card.

5. A data storage apparatus as claimed in claim 1, further provided with a detector for detecting the insertion of the external recording medium into, or its ejection from, the insertion receptacle; and
   power supply to the whole data storage apparatus is started when said detector detects the insertion of said external recording medium into the insertion receptacle.

6. A data storage apparatus as claimed in claim 1, wherein incidental information can be added or edited when data are transmitted from said built-in recording medium to an external recording medium.

7. A data storage apparatus as claimed in claim 1, further provided with a discriminator for discerning whether or not the capacity of an external recording medium is unoccupied when data are transmitted from said built-in recording medium to said external recording medium, wherein any transfer of data from the built-in recording medium to the external recording medium is prohibited if said discriminator finds the capacity of the external recording medium occupied.

8. A data storage apparatus as claimed in claim 7, wherein said discriminator discerns whether or not the capacity of the external recording medium is unoccupied when said external recording medium is inserted into the insertion receptacle, and data are once transferred from said recording medium to said built-in recording medium if the capacity of said external recording medium is found occupied.

9. A data storage apparatus as claimed in claim 1, further provided with additional information input means, wherein:
   said control unit, when data recorded in said built-in recording medium are transferred to an external recording medium, adds additional information entered from said additional information input means to said external recording medium, and records the augmented information.

10. A data storage apparatus as claimed in claim 1, wherein said control unit, using management information concerning data recorded in said external recording medium, records data from an external recording medium into said built-in recording medium in a classified state.

11. A data storage apparatus comprising:
   a built-in recording medium having a first recording capacity, housed undetachably in a recording apparatus;
   a head for executing a recording/reproducing operation on said built-in recording medium;
   a controller for controlling the elevating/lowering operation of the head relative to said built-in recording medium;
   a signal processing unit for encoding record data for said built-in recording medium with said head and decoding data reproduced from said built-in recording medium with said head;
   an insertion receptacle capable of letting a portable external recording medium, having a smaller recording capacity than said first recording capacity, be inserted thereinto;
   a detector for detecting the insertion of the external recording medium into, or its ejection, from the insertion receptacle;
   a data bus for allowing data to be transferred between an external recording medium inserted into saidinsertion receptacle and said built-in recording medium; and
   a transfer control unit for allowing, in said state of standing by for recording, the magnetic head in contact with said built-in recording medium, to take refuge in a refuge area where it does not record onto said built-in recording medium, and transferring, in said recording state, the magnetic head in contact with said built-in recording medium to an area where it records onto said built-in recording medium; wherein
   the elevating/lowering operation of said head is controlled according to the insertion of the external recording medium into the insertion receptacle, or its ejection therefrom, as detected by said detector.

* * * * *